US011055322B2

(12) United States Patent
Gee et al.

(10) Patent No.: US 11,055,322 B2
(45) Date of Patent: Jul. 6, 2021

(54) COMPARISON OF A PART KEY TO MACHINE KEYS

(71) Applicant: HEWLETT PACKARD ENTERPRISE DEVELOPMENT LP, Houston, TX (US)

(72) Inventors: Stephen K. Gee, Pleasanton, CA (US); Neil Asmussen, Houston, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 266 days.

(21) Appl. No.: 16/049,392

(22) Filed: Jul. 30, 2018

(65) Prior Publication Data

US 2020/0034478 A1  Jan. 30, 2020

(51) Int. Cl.
*G06F 16/28* (2019.01)

(52) U.S. Cl.
CPC .......... *G06F 16/288* (2019.01); *G06F 16/285* (2019.01)

(58) Field of Classification Search
CPC ........... G06F 2009/45587; G06F 21/10; G06F 21/57; G06F 21/6218; G06F 9/45533
See application file for complete search history.

(56) References Cited

U.S. PATENT DOCUMENTS

| | | | |
|---|---|---|---|
| 6,263,170 B1 | 7/2001 | Bortnem | |
| 7,415,563 B1 | 8/2008 | Holden et al. | |
| 7,434,053 B2 | 10/2008 | Parry et al. | |
| 7,735,079 B1 | 6/2010 | Davis et al. | |
| 8,311,419 B2 | 11/2012 | Jones et al. | |
| 8,347,014 B2 | 1/2013 | Schubert et al. | |
| 2002/0004761 A1 | 1/2002 | Sekitani | |
| 2002/0103727 A1 | 8/2002 | Tait et al. | |
| 2004/0230815 A1* | 11/2004 | Goodman | G06F 21/572 713/191 |
| 2005/0060546 A1 | 3/2005 | Parry et al. | |
| 2009/0300717 A1 | 12/2009 | Mandava | |
| 2014/0196142 A1 | 7/2014 | Louboutin et al. | |
| 2015/0258737 A1 | 9/2015 | Dawson et al. | |
| 2015/0317473 A1 | 11/2015 | Lim et al. | |
| 2016/0203311 A1 | 7/2016 | Kaines | |
| 2017/0053050 A1 | 2/2017 | Kothari et al. | |
| 2019/0090375 A1 | 3/2019 | Hsue et al. | |

OTHER PUBLICATIONS

Antec Inc., "Power Supply Comparison Chart," Jun. 9, 2015, http://support.antec.com/support/solutions/articles/1000140887-power-supply-comparison-chart.

(Continued)

*Primary Examiner* — Truong V Vo

(74) *Attorney, Agent, or Firm* — Trop, Pruner & Hu, P.C.

(57) ABSTRACT

Examples include comparison of a part key to machine keys. Examples include identification of a part key assigned to a given machine identifier in a part key mapping of a part received by a computing device, the part key mapping including a plurality of part keys assigned to a plurality of machine identifiers. Examples also include comparison of the identified part key to machine keys stored on the computing device to determine whether the identified part key matches any of the machine keys, and based at least in part on a result of the determination, enabling or inhibiting further utilization of the part.

20 Claims, 5 Drawing Sheets

(56) References Cited

OTHER PUBLICATIONS

Antec, "How do I pick out a compatible replacement power supply?" (Research Paper), Nov. 3, 2014, http://support.antec.com/support/solutions/articles/1000140018-how-do-i-pick-out-a-compatible-replacement-power-supply.
Dell Inc., "Dell EMC Storage Compatibility Matrix for SC, PS and FS Series Arrays," A Dell EMC Deployment and Configuration Guide, Jul. 2017, <en.community.dell.com/dell-groups/dtcmedia/m/mediagallery/20438558/download.
Hewlett Packard Enterprise, "HPE Data Availability, Protection and Retention Compatibility Matrix," May 2018, Version 1, <https://support.hpe.com/hpsc/doc/public/display?docId=c04616269>.
Hewlett-Packard Company, "HP SPAR Host Explorer Software Support Matrix," Sep. 2015, https://support.hpe.com/hpsc/doc/public/display?docId=emr_na-c04790896.
Justin Nevill, "Compatibility Matrix," available Oct. 27, 2017, Docker Success Center, https://success.docker.com/Policies/Compatibility_Matrix.
SFF Committee, "SFF-8472: Specification for Diagnostic Monitoring Interface for Optical Transceivers," Nov. 21, 2014, Rev 12.2.

* cited by examiner

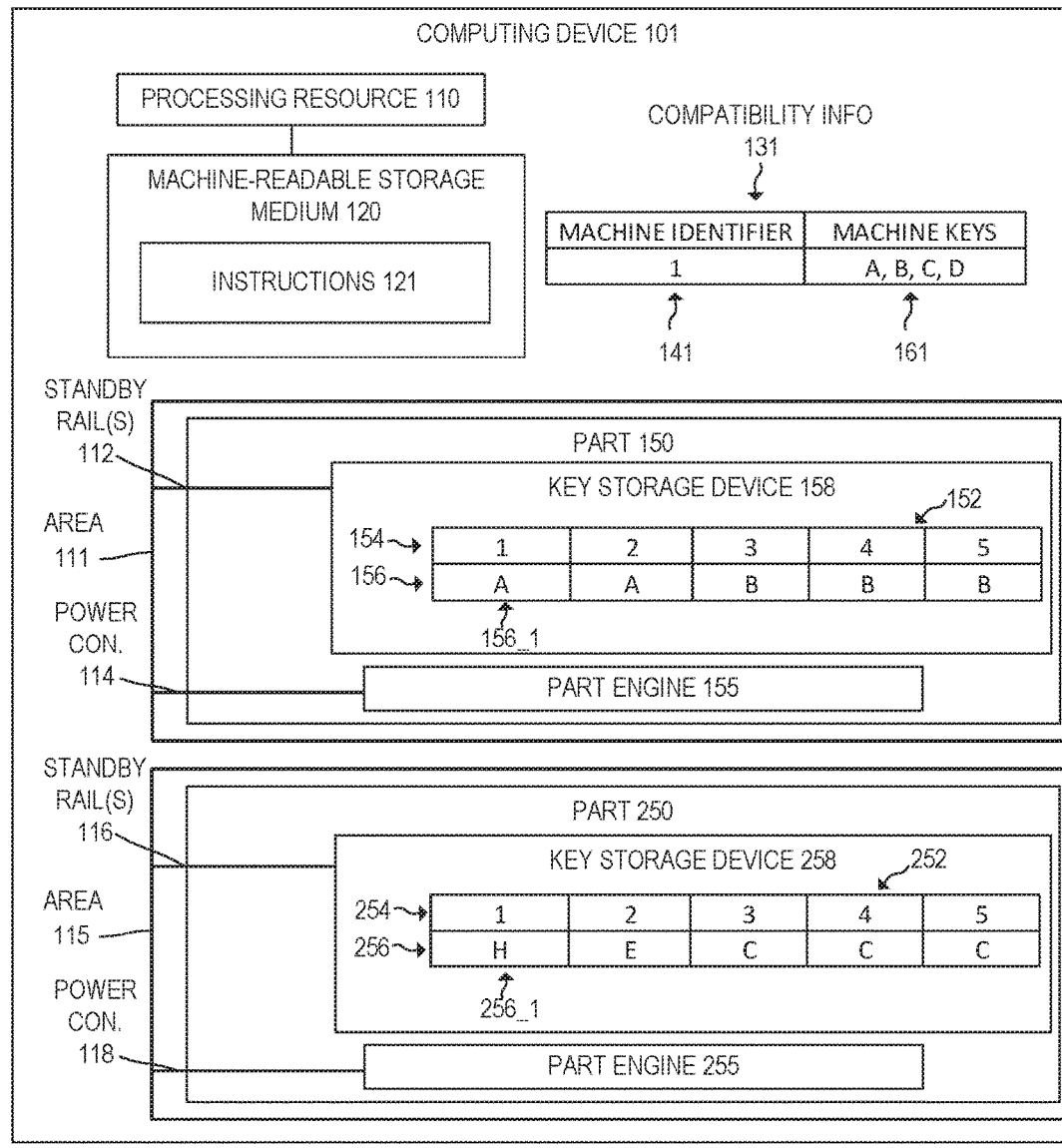
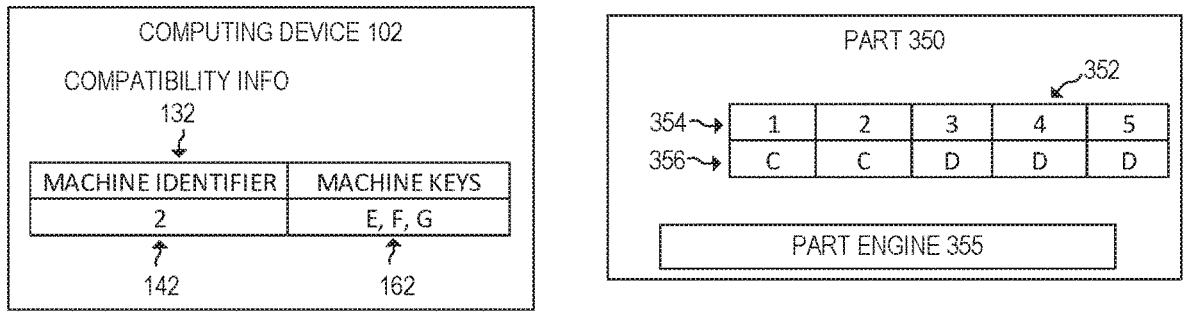
FIG. 2

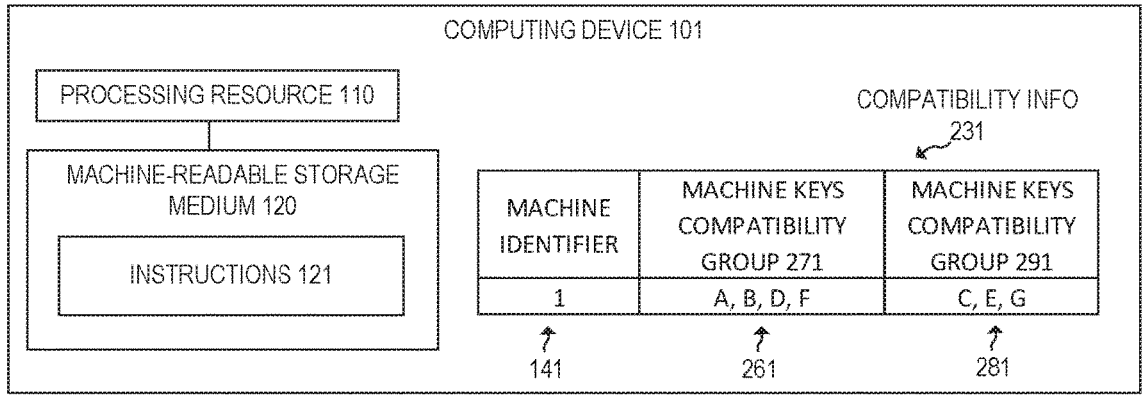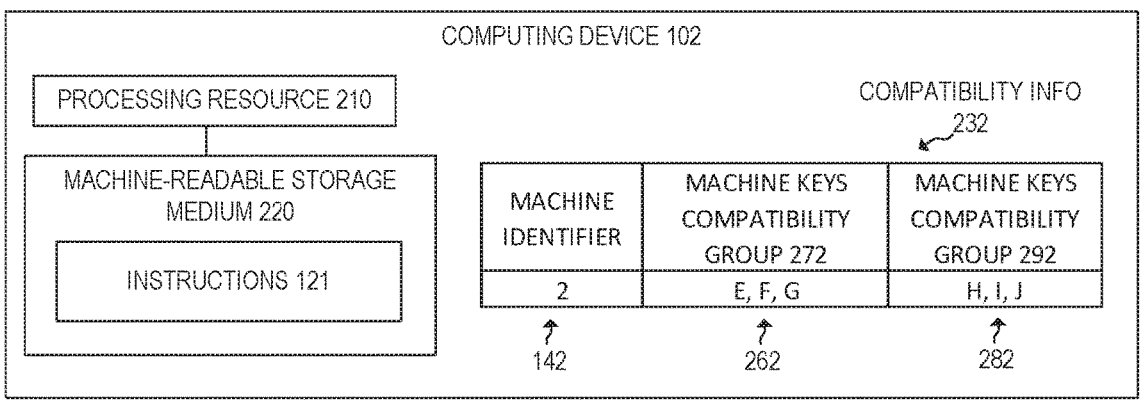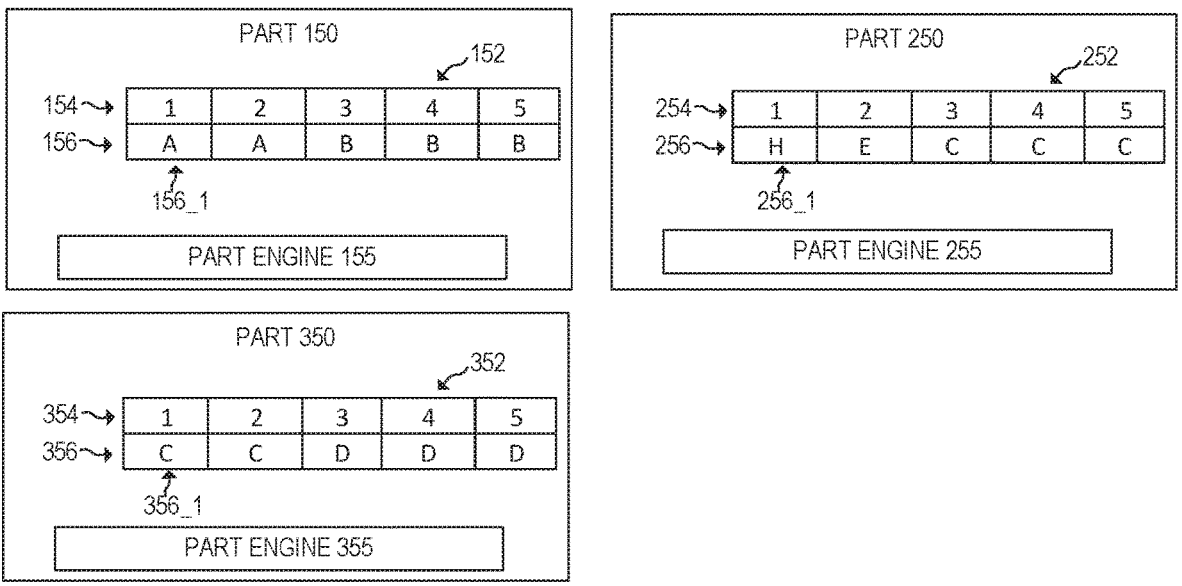
FIG. 3

COMPUTING DEVICE 101 — 231

| MACHINE IDENTIFIER | MACHINE KEYS COMPATIBILITY GROUP 1 | MACHINE KEYS COMPATIBILITY GROUP 2 |
|---|---|---|
| 1 | A, B, D, F | C, E, G |
| ↑ 241 | ↑ 261 | ↑ 281 |

COMPUTING DEVICE 102 — 232

| MACHINE IDENTIFIER | MACHINE KEYS COMPATIBILITY GROUP 272 | MACHINE KEYS COMPATIBILITY GROUP 292 |
|---|---|---|
| 2 | E, F, G | H, I, J |
| ↑ 242 | ↑ 262 | ↑ 282 |

COMPUTING DEVICE 103 — 233

| MACHINE IDENTIFIER | MACHINE KEYS COMPATIBILITY GROUP 273 | MACHINE KEYS COMPATIBILITY GROUP 293 |
|---|---|---|
| 3 | C, D, E | K, L, M |
| ↑ 243 | ↑ 263 | ↑ 283 |

PART 150 — 152

| 154 → | 1 | 2 | 3 | 4 | 5 |
|---|---|---|---|---|---|
| 156 → | A | A | B | B | B |

PART 250 — 252

| 254 → | 1 | 2 | 3 | 4 | 5 |
|---|---|---|---|---|---|
| 256 → | H | E | C | C | C |
|  |  |  | ↑ 256_3 |  |  |

PART 350 — 352

| 354 → | 1 | 2 | 3 | 4 | 5 |
|---|---|---|---|---|---|
| 356 → | C | C | D | D | D |
|  |  |  | ↑ 356_3 |  |  |

PART 450 — 452

| 454 → | 1 | 2 | 3 | 4 | 5 |
|---|---|---|---|---|---|
| 456 → | L | L | L | L | L |
|  |  |  | ↑ 456_3 |  |  |

*FIG. 4A*

COMPUTING DEVICE 103 — 233

| MACHINE IDENTIFIER | MACHINE KEYS COMPATIBILITY GROUP 273 | MACHINE KEYS COMPATIBILITY GROUP 293 |
|---|---|---|
| 3 | C, D, E, L | K, M |
| ↑ 243 | ↑ 263 | ↑ 283 |

*FIG. 4B*

COMPUTING DEVICE 103 — 233

| MACHINE IDENTIFIER | MACHINE KEYS COMPATIBILITY GROUP 273 | MACHINE KEYS COMPATIBILITY GROUP 293 |
|---|---|---|
| 3 | D, E, L | K, M |
| ↑ 243 | ↑ 263 | ↑ 283 |

*FIG. 4C*

COMPARISON OF A PART KEY TO MACHINE KEYS

BACKGROUND

Computing devices, such as servers, storage arrays, and the like, include many different component parts that may be replaceable in case of failure or other malfunction. Such parts may be, for example, power supplies, memory modules, storage drives, and the like. Computing devices may utilize multiple such parts, and multiple of the same kind of part (e.g., multiple power supplies, multiple memory modules, multiple storage drives, etc.). However, some specific parts may not be useable with certain computing devices or with certain other parts, and may cause failure or malfunction if used with those computing devices or other parts.

BRIEF DESCRIPTION OF THE DRAWINGS

The following detailed description references the drawings, wherein:

FIG. 2 is a block diagram of an example of computing devices having different collections of machine keys and parts having different part key mappings;

FIG. 3 is a block diagram of an example of computing devices each having multiple compatibility groups and parts having different part key mappings;

FIG. 4A is a block diagram of another example of computing devices each having multiple compatibility groups and parts having different part key mappings;

FIG. 4B is a block diagram of an example computing device having a machine key moved between different compatibility groups;

FIG. 4C is a block diagram of an example computing device having a machine key removed from its compatibility groups;

DETAILED DESCRIPTION

Figure 1:
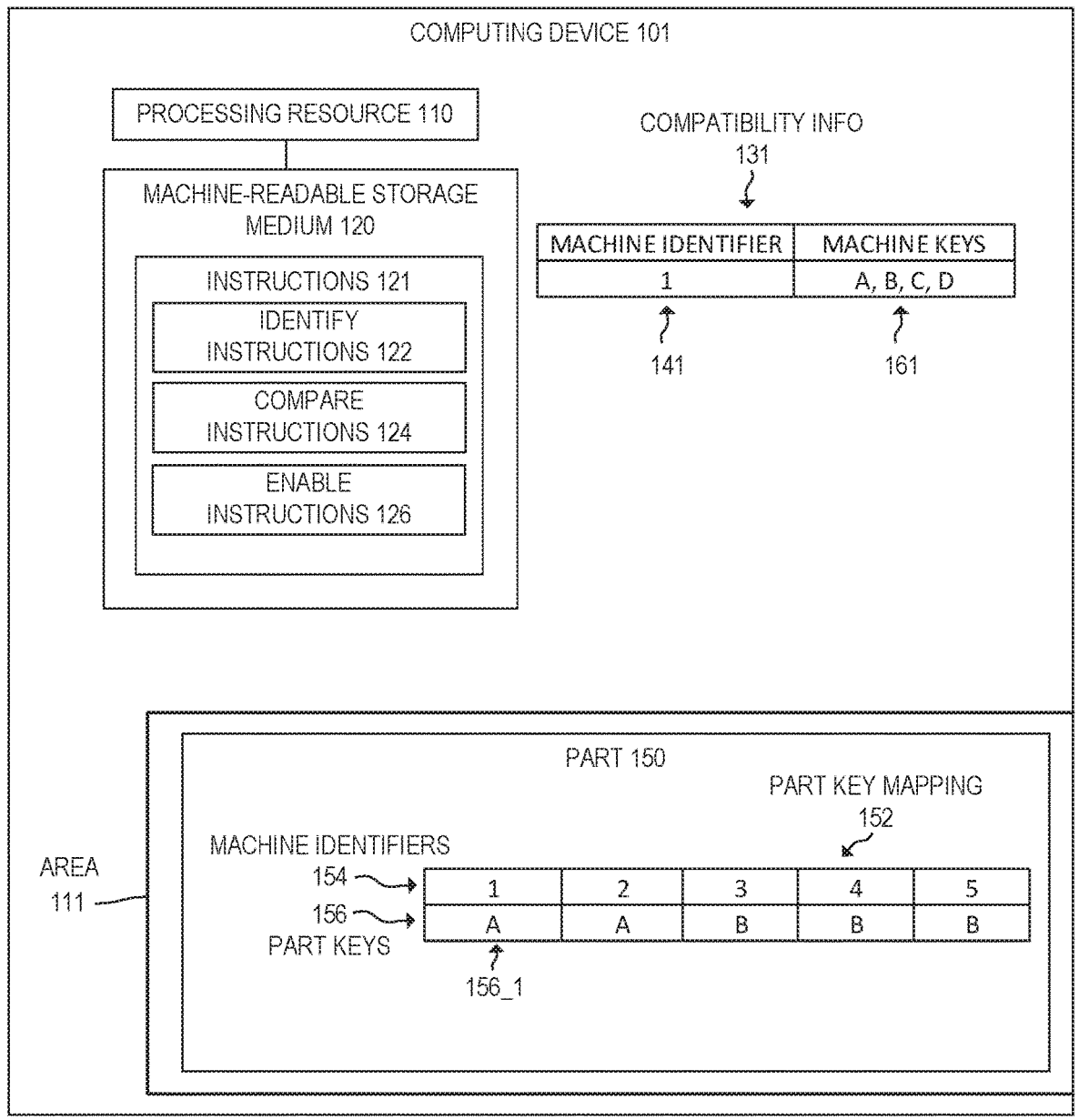
FIG. 1 is a block diagram of an example computing device to compare an identified part key to a collection of one or more machine keys.

As noted above, some component or replacement parts (which may be referred herein simply as "parts") may not be useable with certain computing devices or with certain other parts, and may cause failure or malfunction if used with those computing devices or other parts. As such, testing may be conducted to determine which parts are useable with (i.e., "compatible with") which computing devices, and which parts may be used in combination with (i.e., are "compatible with") other parts. When such testing is done prior to release of one or more computing devices, each of the computing devices may be provided with a list of the parts that may be used with the computing device. However, if new parts are created and determined to be qualified for use with certain computing devices or if existing parts are later determined to be disqualified for use with certain computing devices, then the above example may involve updating the lists on the computing devices to add or remove particular parts.

Similarly, when the above testing is done prior to release of one or more parts, each of the parts may be provided with a list of the computing devices that may use the part. However, if new parts are created and determined to be qualified for use with certain computing devices or if existing parts are later determined to be disqualified for use with certain computing devices, then this example may involve updating the lists on the parts to add or remove particular computing devices. In addition, the examples described above may not address the cross-compatibility of different parts (e.g., which parts may be used together in particular computing devices).

To address these issues, in examples described herein, a computing device may be associated with a given machine identifier, may store a collection of one or more machine keys, and may receive a part storing a part key mapping. Such a part key mapping may include a plurality of part keys assigned to a plurality of machine identifiers, where at least some of the part keys assigned to different machine identifiers are different. In examples described herein, such a computing device may identify a first part key that is assigned to the given machine identifier in the part key mapping and compare the identified part key to the machine keys stored on the computing device. In such examples, the computing device may enable further utilization of the received part by the computing device based at least in part on a determination that the identified first part key matches one of the machine keys, or may inhibit (or otherwise not enable) further utilization of the received part by the computing device based at least in part on a determination that the identified first part key does not match any of the machine keys.

In this manner, examples described herein may provide a flexible framework to enable a computing device to determine compatibility of parts with the computing device and either enable or inhibit use of the parts based on such determinations. For example, each computing device may be provided with its own set of "N" machine keys that match corresponding part keys of parts compatible with the computing device, and its own set of "M" spare machine keys that do not match part keys of existing parts, but are available for use by parts created or qualified in the future (where "N" and "M" represent integers). In such examples, when such a new part is created and/or qualified as compatible with some computing devices but not others, the part key mapping of the part may, for example, store one of the "M" spare keys in association with the machine identifiers of the computing devices it is compatible with, and for the computing devices it is not compatible with, may associate part keys not used by those computing device with the machine identifiers for those computing devices. In this manner, the part may be later qualified for use on some computing devices and not on others without changes to any of those computing devices.

Similarly, various parts may store part mappings with appropriate keys associated with each machine identifier, based on whether the part is compatible with the computing device associated with that machine identifier. In such examples, the parts may also have additional (e.g., unused) keys mapped to additional (e.g., unused) machine identifiers. In this manner, in some examples, when a new computing device is created that is compatible with some parts but not others, the computing device may store machine keys that match the part keys mapped to the machine identifier of the computing device, but not store the part keys mapped to the machine identifier in incompatible parts. In such examples, the new machine may be enabled for use with some, but not all, existing parts, without changes to the existing parts.

In addition, such examples may enable post-release qualification or disqualification of existing parts and existing machines by updating machine keys of a computing device or the part keys of a part. Additionally, in some examples, the machine identifiers may be associated with groups of computing devices (such as classes, types, families of computing devices, or the like). In such examples, examples described herein may simplify the qualification of parts for such groups of computing devices, which may be treated together. Such examples described herein may be useful, for example, where similar computing devices and parts are utilized, but are not always compatible.

Examples described herein may also utilize compatibility groups, such that computing devices may determine not only whether certain parts are compatible for use with a computing device, but also whether the parts are compatible for use with one another in the computing device. For example, a computing device may comprise a first compatibility group including a first collection of machine keys and a second compatibility group including a second collection of machine keys. In such examples, a computing device may determine whether or not to enable use of a plurality of parts based on a determination of whether the part key mappings of each of the parts associates a part key matching a machine key of the same compatibility group to the machine identifier of the computing device. In this manner, examples described herein may determine not to enable a part for use in the computing device when the part is determined not to be compatible with another part received by the computing device, even though the part itself may be compatible with the computing device.

Referring now to the drawings, FIG. 1 is a block diagram of an example computing device 101 to compare an identified part key to a collection of one or more machine keys. In the example illustrated in FIG. 1, computing device 101 includes at least one processing resource 110 and at least one machine-readable storage medium 120 comprising (e.g., encoded with) at least storage instructions 121 that are executable by the at least one processing resource 110 of computing device 101 to implement functionalities described herein in relation to instructions 121. Instructions 121 may include at least instructions 122, 124, and 126, which may be executable by the at least one processing resource 110.

Computing device 101 may include compatibility information 131, comprising a machine identifier 141 associated with computing device 101, and a collection of one or more machine keys 161. Compatibility information 131 may be stored on any suitable machine-readable storage medium of computing device 101 (e.g., storage medium 120, or another machine-readable storage medium of computing device 101). In examples described herein, compatibility information of a computing device may be stored in firmware or an operating system of the computing device, or separate from such firmware and operating system in a machine-readable storage medium of the computing device 101. In the example illustrated in FIG. 1, the machine identifier 141 associated with computing device 101 may be "1". Although machine identifiers are illustrated as having numeric values herein for ease of illustration, in examples described herein, machine identifiers may take any suitable format (e.g., numeric values, alphanumeric values, binary values, hexadecimal values, etc.). In some examples, each different machine identifier (i.e., each different machine identifier value) may be associated with (or identify) a different collection of one or more computing devices. For example, each machine identifier (i.e., each machine identifier value) may identify a respective computing device, a respective class of computing device, a respective type of computing device, a respective family of computing devices, or any other suitable collection of computing devices. In such examples, different machine identifiers (i.e., different machine identifier values) may identify different collections of one or more computing devices (e.g., different computing devices, different classes, types, or families of computing devices, or the like).

In the example illustrated in FIG. 1, machine keys 161 may include machine keys A, B, C, and D, although compatibility information 131 may include more, fewer, or different machine keys, or a combination thereof. Although machine keys and part keys are represented by letters herein for ease of illustration, in examples described herein, machine keys and part keys may represent respective values in any suitable format (e.g., numeric values, alphanumeric values, binary values, hexadecimal values, etc.). In some examples, machine keys and part keys (which may be referred to collectively as "keys" herein) may have a data protection format in which values represented by the keys are encoded in a manner that may, in some cases, enable one or both of detection of corruption of a key and recovery of the value of the key after such corruption. For example, the keys may be protected with any of various parity, checksum, erasure coding, or digital signature techniques, or the like.

Computing device 101 may also include an area 111 capable of receiving one or more types of parts for computing device 101. For example, area 111 may comprise a bay, slot, opening, or the like, and may comprise one or more connectors to connect a part to computing device 101 (e.g., electrical connections to provide power to and/or from the part, or one or more electrical connections to transmit electrical communications between a part and computing device 101). In examples described herein, a computing device that has "received" a part is a computing device that is connected to the part such that the two may at least exchange electronic signals. In the example illustrated in FIG. 1, computing device 101 has received a part 150 in area 111. In examples described herein, a "part" may be any component of a computing device, such as, for example, a power supply, memory module, storage drive, or the like.

In the example illustrated in FIG. 1, part 150 may comprise a part key mapping 152 stored on a suitable machine-readable storage medium of part 150 (see FIG. 2). In some examples, the machine-readable storage medium may be an electrically erasable programmable read-only memory (EEPROM). Part key mapping 152 may comprise a plurality (e.g., list, set, etc.) of part keys 156 that are assigned to (e.g., indexed by or associated with) respective machine identifiers of a plurality of machine identifiers 154. In examples described herein, a part key mapping may be implemented by any suitable data structure from which part keys may be retrieved by their assigned machine identifiers. In some examples, machine identifiers may be used as indices into the part key mapping to retrieve respective part keys. As such, for ease of explanation, array nomenclature may be used herein to demonstrate indexing of a part key mapping, and the part key indexed by a particular machine identifier. For example, part key mapping 152 may be represented by an identifier "Mapping_152", and "Mapping_152[X]" may indicate a part key stored at (or in association with) an index "X". In the example illustrated in FIG. 1, for example, Mapping_152[1]=A, which indicates that part key mapping 152 stores a part key A in association with machine identifier "1" (i.e., part key A is indexed by machine identifier "1" in part key mapping 152), and Mapping_152[3]=B, which indicates that part key mapping 152 stores a part key B in association with machine identifier "3" (i.e., part key B is indexed by machine identifier "3" in part key mapping 152). Similar nomenclature used herein is to be understood similarly throughout. In the example illustrated in FIG. 1, part key mapping 152 has different part keys assigned to different machine identifiers, for at least some of machine identifiers 154. For example, in part key mapping 152, part key A is assigned to each of machine identifiers "1" and "2", and different part key B is assigned to each of machine identifiers "3", "4", and "5".

As noted above, in the example illustrated in FIG. 1, computing device 101 has received part 150. In such examples, instructions 122 may identify a part key that is assigned to the machine identifier 141 ("1") in part key mapping 152, where the machine identifier 141 ("1") is associated with computing device 101. In such examples, instructions 122 may use the value "1" of machine identifier 141 as an index into part key mapping 152 to identify a part key A mapped to machine identifier "1" (i.e., Mapping_152 [1]=A; see also reference numeral 156_1).

In such examples, instructions 124 may compare the identified part key A (156_1) to the collection of machine keys 161 stored on computing device 101 to determine whether the identified part key A (156_1) matches any of the machine keys of the collection of machine keys 161. In examples described herein, keys may be determined to match if they are identical, represent the same value, or the like. For ease of illustration, matching keys are illustrated herein with the same letter.

Based at least in part on a determination of whether the identified part key A (156_1) matches any of machine keys 161, instructions 126 may enable further utilization of the received part 150 by computing device 101 or inhibit further utilization of the received part 150 by computing device 101. For example, based at least in part on a determination that the identified part key A (156_1) matches one of machine keys 161, instructions 126 may enable further utilization of the received part 150 by computing device 101. In other examples, based at least in part on a determination that the identified part key A (156_1) does not match any of machine keys 161, instructions 126 may inhibit further utilization of the received part 150 by computing device 101.

In the example illustrated in FIG. 1, machine keys 161 include keys A, B, C, and D, so the identified part key A (156_1) does match one of machine keys 161 (i.e., machine key A). As such, in the example illustrated in FIG. 1, instructions 124 may determine, based on the comparison, that the identified part key A (156_1) matches machine key A of machine keys 161 of computing device 101. In such examples, instructions 126 may enable further utilization of the received part 150 by computing device 101 based at least in part on the determination, by instructions 124, that the identified part key A (156_1) matches machine key A of machine keys 161.

In another example in which machine keys 161 do not include machine key A, instructions 124 may determine, based on the comparison, that the identified part key A (156_1) does not match any of machine keys 161 of computing device 101. In such examples, instructions 126 may inhibit further utilization of the received part 150 by computing device 101, based at least in part on the determination that the identified part key A (156_1) does not match any of machine keys 161.

In some examples, when a part key indexed by a machine identifier of a computing device in a part key mapping of the part matches a machine key of the computing device, the part and the computing device may be understood to be compatible with one another. A collection of machine keys stored on a computing device may thereby indicate parts considered to be compatible with the computing device. In such examples, each part received by the computing device that includes a part key, assigned to the given machine identifier, that matches one of the machine keys, may be considered compatible with the computing device.

In some examples, when a part key indexed by a machine identifier of a computing device in a part key mapping of the part does not match any machine key of the computing device, the part and the computing device may be considered incompatible with one another. In such examples, based at least in part on a determination that the identified part key A (156_1) does not match any of machine keys 161 (e.g., in the case that machine keys omit key A), instructions 126 may further record, output, or both, an alert or other information indicating that the part 150 has been determined not to be compatible with computing device 101. In such examples, instructions 126 may record the alert or information on computing device 101 (e.g., in a log) or on another computing device, for example. In such examples, instructions 126 may output the alert or information via a user interface or to another computing device, or the like.

In some examples, a collection of machine keys of a computing device may include one or more spare machine keys, which may be machine keys that do not have matching part keys on any parts. Such spare machine keys may be used, for example, on parts made after production of the computing device that are determined to be compatible with the computing device, without involving changes to the computing device. In the example illustrated in FIG. 1, for example, machine keys C and D may be spare machine keys that are not used by existing parts.

In some examples, a part key mapping of a part may include one or more spare part keys, which may be part keys indexed by machine identifiers that are not yet associated with any computing devices. As an example, such spare part keys may later be associated with a collection of one or more computing devices made after production of the part and with which the part is determined to be compatible, such that the part may be used with the computing device without involving changes to the part. Although, for ease of illustration, example part key mappings illustrated herein shows five part keys indexed by five machine identifiers (i.e., 1-5), in other examples any of these mappings may include may include more, fewer, or different part keys (or a combination thereof) indexed by more, fewer, or different machine identifiers (or a combination thereof).

As used herein, functionalities described as performed by instructions 121 may be performed by execution of any of instructions 122, 124, and 126, or other instructions among instructions 121. Similarly, functionalities described as performed by instructions 122, 124, or 126, may be considered to be functionalities performed by instructions 121 (which include instructions 122, 124, and 126). In examples described herein, functionalities described as being performed by "instructions" may be understood as functionalities that may be performed by those instructions when executed by a processing resource. In other examples, functionalities described in relation to instructions 121 may be implemented by one or more engines, which may be any combination of hardware and programming to implement the functionalities of the engine(s). In some examples, functionalities described herein in relation to FIG. 1 may be provided in combination with functionalities described herein in relation to any of FIGS. 2-6.

FIG. 2 is a block diagram of an example of computing devices having different collections of machine keys, and parts having different part key mappings. The example illustrated in FIG. 2 is different than the example illustrated in FIG. 1, but for ease of illustration, expands on the example illustrated in FIG. 1, as described above. However, the example described in relation to FIG. 2 is not be construed as limiting the example illustrated in FIG. 1.

The example illustrated in FIG. 2 includes computing device 101, comprising processing resource 110, storage medium 120, instructions 121, compatibility information 131, and area 111, as described above. In the example illustrated in FIG. 2, area 111 has received part 150, as described above. Expanding on the example illustrated in FIG. 1, the example illustrated in FIG. 2 further illustrates a key storage device 158 and a part engine 155 of part 150. Key storage device 158 may be a machine-readable storage medium of part 150 that is to store a part key mapping 152, which is as described above in relation to FIG. 1. In examples described herein, a "part engine" may comprise any functional components of part 150 other than key storage device 158, and which provide any functionalities of part 150 other than the storage of the part key mapping of the part. For example, for a part that is a power supply, its part engine may be the electrical components that function to supply power to a computing device. For a part that is a memory module, the part engine may the electrical components that a computing device may use for general purpose memory functions of the computing device, unlike the key storage device, which may not be used for general purpose memory functions of the computing device, in some examples.

Expanding on the example illustrated in FIG. 1, the example illustrated in FIG. 2 further illustrates that area 111 connects to one or more standby rail(s) 112 of part 150 to partially power part 150 by providing power to key storage device 158 of part 150 without providing power to part engine 155 (e.g., other functional components) of part 150. Providing power to standby rail(s) 112 does not enable part 150 for use by computing device 101. Area 111 also connects to a power connection 114 of part 150 to provide power to part engine 155 (e.g., functional components of part 150 other than key storage device 158) to thereby enable part 150 for use by computing device 101 (i.e., use beyond reading part keys from device 158).

Expanding on the example illustrated in FIG. 1, the example illustrated in FIG. 2 further illustrates that computing device 101 includes an area 115, which has the characteristics described above in relation to area 111, and connects to one or more standby rail(s) 116 of part 250 and a power connection 118 of part 250. In the example illustrated in FIG. 2, area 115 has received a part 250 comprising a key storage device 258 and a part engine 255 of part 250. Key storage device 258 may be a machine-readable storage medium of part 250 that is to store a part key mapping 252 comprising a plurality of part keys 256 that are assigned to (e.g., indexed by or associated with) respective machine identifiers of a plurality of machine identifiers 254. In the example illustrated in FIG. 2, part key mapping 252 may have a different plurality of part keys 256 (e.g., H, E, C, C, C) than the plurality of part keys 156 (e.g., A, A, B, B, B) of part key mapping 152, while the machine identifiers 254 that index part keys 256 in part key mapping 252 may be the same as the machine identifiers 154 (e.g., 1, 2, 3, 4, 5) that index part keys 156 in part key mapping 152. In the example illustrated in FIG. 2, for example, for each of the machine identifiers, part key mapping 152 and part key mapping 252 each assign a different part key to each of the machine identifiers, which are the same in mappings 152 and 252 (i.e., machine identifiers 154 are the same as machine identifiers 254 in FIG. 2).

Computing device 101 may partially power part 250 by providing power to key storage device 258 of part 250 via standby rails 116 without providing power to part engine 255 (e.g., other functional components) of part 250. Providing power to standby rail(s) 116 does not enable part 250 for use by computing device 101. Area 115 also connects to a power connection 118 to provide power to part engine 255 to thereby enable part 250 for use by computing device 101 (i.e., use beyond reading part keys from device 258).

Expanding on the example illustrated in FIG. 1, the example illustrated in FIG. 2 further illustrates another computing device 102 and another part 350. Computing device 102 may store (e.g., in a machine-readable storage medium) compatibility information 132, comprising a machine identifier 142 ("2") associated with computing device 102, and a collection of one or more machine keys 162 (i.e., E, F, G). Computing device 102 may include a machine-readable storage medium to store a copy of instructions 121 (see FIG. 3), as described above, at least one processing resource to execute instructions 121 (see FIG. 3), and one or more areas to receive parts (e.g., as described above in relation to areas 111 and 115) (not shown). In such examples, computing device 102 may perform any of the functionalities described herein in relation to computing device 101. Part 350 may include a key storage device (e.g., machine readable storage medium) (not shown) to store a part key mapping 352 comprising a plurality of part keys 356 that are assigned to (e.g., indexed by or associated with) respective machine identifiers of a plurality of machine identifiers 354. Part 350 may also include a part engine 355 (e.g., functional components of part 350 other than the key storage device).

In the example illustrated in FIG. 2, instructions 121 may determine whether to enable part 150 based on part keys 156 of part 150 and machine keys 161, as described above, and may determine whether to enable part 250 based on part keys 256 of part 250 and machine keys 161. In the example illustrated in FIG. 2, using the machine identifier 141 ("1") associated with computing device 101, instructions 121 may determine that the part key A indexed by machine identifier 141 ("1") in part key mapping 152 of part 150 (i.e., Mapping_152[1]=A, as illustrated in FIG. 2) matches machine key A of machine keys 161, and thus may be enabled. However, instructions 121 may determine that the part key H indexed by machine identifier 141 ("1") in part key mapping 252 of part 250 (i.e., Mapping_252[1]=H, as illustrated in FIG. 2) does not match any machine key of machine keys 161, and thus should not be enabled. In this manner, instructions 121 may determine that part 150 is considered compatible with computing device 101, while part 250 is not considered compatible with computing device 101. In such examples, the part key A (156_1) identified as indexed by machine identifier 141 ("1") in part key mapping 152 of part 150 may be different than the part key H (indicated by 256_1) identified as indexed by machine identifier 141 ("1") in part key mapping 252 of part 250.

In more detail, after receiving part 150 in area 111 of computing device 101, instructions 121 may partially power part 150 by providing power to standby rails 112 of part 150 to enable key storage device 158 of part 150, which stores part key mapping 152 (described above). Providing the power to the standby rails 112 provides power to key storage device 158, but does not provide power to enable full operation of part 150 (e.g., to enable part engine 155 of part 150).

While part 150 is partially powered (i.e., while power is provided to the standby rails 112 of part 150), instructions 121 may access part key mapping 152 stored on device 158 of part 150 and may identify, in part key mapping 152, a part key A (156_1) that is assigned to the machine identifier 141 ("1") associated with computing device 101 (i.e., Mapping_152[1]=A).

Instructions 121 may then compare the identified part key A (156_1) to the collection of machine keys 161 stored on computing device 101. In the example illustrated in FIG. 2, based at least in part on a determination that the identified part key A (156_1) matches one of the machine keys (i.e., machine key A), instructions 121 may fully power the received part 150 to enable further utilization of part 150 by computing device 101. In examples described herein, enabling a part for "further utilization" means enabling the part for utilization beyond partially powering the part and accessing a part key mapping stored on the part. In some examples, to enable further utilization of part 150 in the example illustrated in FIG. 2, instructions 121 may cause computing device 101 to fully power part 150 by providing power sufficient for full operation of part 150, such as by providing power to part engine 155 via power connection 114. In some examples, to enable further utilization of part 150 may include providing a signal to part 150 to instruct it to turn on.

In other examples, the identified part key A (156_1) may not be present in machine keys 161. In such examples, based at least in part on a determination that identified part key A (156_1) does not match any of machine keys 161, instructions 121 may inhibit further utilization of part 150 by computing device 101. In examples described herein, to inhibit further utilization of a part may comprise not enabling the part for further utilization (as described above). For example, instructions 121 may inhibit further utilization of part 150 by computing device 101 by not fully powering part 150. In some examples, to inhibit further utilization a part may include not providing a signal to the part to instruct it to turn on. For example, instructions 121 may inhibit further utilization of part 150 by not providing power sufficient for full operation of part 150, such as by not providing power to part engine 155 via power connection 114. In some examples, to inhibit further utilization of part 150 may include not providing a signal to part 150 to instruct it to turn on.

In some examples, such as those described above in relation to FIG. 2, instructions 121 of computing device 101 may stage the power on of parts that are received by computing device 101 such that computing device 101 may partially power on a received part to access its part keys and make a compatibility determination (based on comparison of part and machine keys, as described above) to determine whether or not to fully power on the received part.

As noted above, instructions 122 may also determine whether to enable part 250 based on part keys 256 of part 250 and machine keys 161 of computing device 101. For example, after receiving part 250 in area 115 of computing device 101, instructions 121 may partially power part 250 by providing power to standby rails 116 of part 250 to enable key storage device 258 of part 250, which stores part key mapping 252. Providing the power to the standby rails 116 provides power to key storage device 258, but does not provide power to enable full operation of part 250 (e.g., to enable part engine 255 of part 250).

In the example illustrated in FIG. 2, using the machine identifier 141 ("1") associated with computing device 101, instructions 121 may determine that the part key H indexed by machine identifier 141 ("1") in part key mapping 252 of part 250 (i.e., Mapping_252[1]=H) does not match any machine key of machine keys 161, and thus may inhibit further utilization of part 250.

In more detail, while part 250 is partially powered (i.e., while power is provided to the standby rails 116 of part 250), instructions 121 may access part key mapping 252 stored on device 258 of part 250 and may identify, in part key mapping 252, a part key H (256_1) that is assigned to the machine identifier 141 ("1") associated with computing device 101 (i.e., Mapping_252[1]=H). Instructions 121 may then compare the identified part key H (256_1) to the collection of machine keys 161 stored on computing device 101. In the example illustrated in FIG. 2, based at least in part on a determination that the identified part key H (256_1) does not matches any of machine keys 161, instructions 121 may inhibit (or otherwise not enable) further utilization of part 250 by computing device 101. For example, instructions 121 may inhibit further utilization of part 250 by computing device 101 by not fully powering part 150. For example, instructions 121 may inhibit further utilization of part 150 by not providing power sufficient for full operation of part 250, such as by not providing power to part engine 255 via power connection 118. In some examples, to inhibit further utilization of part 250 may include not providing a signal to part 250 to instruct it to turn on.

In other examples, the identified part key H (256_1) may be present in machine keys 161. In such examples, based at least in part on a determination that identified part key H (256_1) matches one of machine keys 161, instructions 121 may fully power the received part 250 to enable further utilization of part 250 by computing device 101. For example, instructions 121 may cause computing device 101 to fully power part 250 by providing power sufficient for full operation of part 250, such as by providing power to part engine 255 via power connection 118. In some examples, to enable further utilization of part 250 may include providing a signal to part 250 to instruct it to turn on. In some such examples, both the identified part key A (156_1) and the identified part key H (256_1) may be present in machine keys 161. In such examples, based at least in part on determinations that the identified part key A (156_1) matches one of machine keys 161 and the identified part key H (256_1) matches one of machine keys 161, instructions 121 may enable further utilization of part 150 and part 250 by computing device 101.

In the example illustrated in FIG. 2, part 150 may be compatible with computing device 101 and may not be compatible with computing device 102. In such examples, part key mapping 152 may include a part key matching one of machine keys 161 in association with machine identifier "1" of computing device 101 (e.g., Mapping_152[1]=A) and may include a part key not matching any of machine keys 162 of computing device 102 in association with machine identifier "2" of computing device 102 (e.g., Mapping_152[2]=A). In such examples, computing device 101 may enable part 150 when received (as described above), and computing device 102 may inhibit further utilization of part 150 when received.

Also in the example illustrated in FIG. 2, part 250 may not be compatible with computing device 101 and may be compatible with computing device 102. In such examples, part key mapping 252 may include a part key matching one of machine keys 162 in association with machine identifier "2" of computing device 102 (e.g., Mapping_252[2]=E) and may include a part key not matching any of machine keys 161 of computing device 101 in association with machine identifier "1" of computing device 101 (e.g., Mapping_252[1]=H). In such examples, computing device 102 may enable part 250 when received, and computing device 101 may inhibit further utilization of part 250 when received (as described above).

In examples described herein, machine keys 161 and 162 and part key mappings 152 and 252 may be set at around the same time (e.g., when computing devices 101 and 102 and parts 150 and 250 are all produced around the same time), or may be set respectively as they are produced (if produced as different times). The example framework described herein may enable the flexibility in encoding compatibility information based on machine keys and part keys, as described herein.

Continuing the above example illustrated in FIG. 2, part 350 may be created after production and release of computing devices 101 and 102 and parts 150 and 250, for example. Part 350 may be the same type of part as part 150 (e.g., both are power supplies, both are memory devices, etc.), and computing device 101 may utilize two of this type of part, which may be either two of part 150, two of part 350, or one of part 150 and one of part 350 (i.e., part 350 is compatible with computing device 101). In such examples, part key mapping 352 of part 350 may be created to include a part key matching one of machine keys 161 of computing device 101 in association with machine identifier "1" of computing device 101 (e.g., Mapping_352[1]=C), such that computing device 101 may enable part 350 when received (as described above). Parts 150 and 350 may be provided with different part keys for the same computing device 101 (e.g., A for part 150 and C for part 350) so that the parts may be distinguished from one another, in case that would be desirable.

In some examples, part 350 is not compatible with computing device 102. In such examples, part key mapping 352 of part 350 may be created to include a part key that does not match any of machine keys 162 of computing device 102 in association with machine identifier "2" of computing device 102 (e.g., Mapping_352[2]=C), such that computing device 102 may inhibit (i.e., not enable) part 350 when received (as described above). In some examples, functionalities described herein in relation to FIG. 2 may be provided in combination with functionalities described herein in relation to any of FIGS. 1 and 3-6.

FIG. 3 is a block diagram of an example of computing devices each having multiple compatibility groups and parts having different part key mappings. The example illustrated in FIG. 3 is different than the examples illustrated in FIGS. 1 and 2, but for ease of illustration, expands on the examples illustrated in FIGS. 1 and 2, respectively, as described above. However, the example described in relation to FIG. 2 is not be construed as limiting the respective examples illustrated in FIGS. 1 and 2.

The example illustrated in FIG. 3 includes computing device 101 comprising processing resource 110, storage medium 120, and instructions 121, as described above, and includes computing device 102 comprising a processing resource (e.g., 210), a storage medium (e.g., 220), and instructions 121, as described above in relation to FIG. 2. In the example illustrated in FIG. 3, computing device 101 comprises (e.g., stores on any suitable machine-readable storage medium) compatibility information 231, comprising machine identifier 141 ("1") associated with computing device 101, a first compatibility group 271 including a collection machine keys 261 (i.e., A, B, D, F), and a second compatibility group 291 including another collection of machine keys 281 (i.e., C, E, G).

In the example illustrated in FIG. 3, computing device 102 comprises (e.g., stores on any suitable machine-readable storage medium) compatibility information 232, comprising machine identifier 142 ("2") associated with computing device 102, a first compatibility group 272 including a collection machine keys 262 (i.e., E, F, G), and a second compatibility group 292 including another collection of machine keys 282 (i.e., H, I, J).

In the example illustrated in FIG. 3, computing device 101 may utilize two of the type of part of which parts 150 and 350 are examples, as described above, but may not utilize one of part 150 and one of part 350 (e.g., parts 150 and 350 are not compatible with one another). As such, computing device 101 may utilize two of part 150 or two of part 350. To enforce this, the machine keys of computing devices 101 and 102 may be placed into compatibility groups as described above without changing parts 150, 250, or 350 (e.g., their respective part mappings). In other examples, the compatibility groups and part key mappings illustrated in FIG. 3 may be set substantially concurrently.

In the example illustrated in FIG. 3, part 150 and computing device 101 are compatible, so part key mapping 152 of part 150 may include a part key associated with machine identifier "1" of computing device 101 (e.g., Mapping_152[1]=A) that matches a machine key A of computing device 101 (e.g., in compatibility group 271). Part 350 and computing device 101 are compatible, so part key mapping 352 of part 350 may include a part key associated with machine identifier "1" of computing device 101 (e.g., Mapping_352[1]=C) that matches a machine key C of computing device 101 (e.g., in compatibility group 291). However, as noted above, parts 150 and 350 are not compatible with one another, so the part keys of parts 150 and 350 that match machine keys of computing device 101 are in different compatibility groups (e.g., Mapping_152[1]=A matching A in compatibility group 271 and Mapping_352[1]=C matching C in compatibility group 291), so the computing device 101 does not enable both parts 150 and 350 together, as described below. As noted above, parts 150 and 350 may be provided with different part keys for the same computing device 101 (e.g., A for part 150 and C for part 350) so that the parts may be distinguished from one another, which facilitates their matching machine keys being in different compatibility groups for computing device 101 in the example illustrated in FIG. 3, for example.

In more detail, in an example in which two of part 150 are received by computing device 101, instructions 121 of computing device 101 may identify a first part key A (156_1) that is assigned to machine identifier 141 ("1") in a part key mapping 152 of a first instance of part 150, and may identify a second part key A (156_1) assigned to machine identifier 141 ("1") in part key mapping 152 of a second instance of part 150. Instructions 121 of computing device 101 may compare the identified first part key A (156_1) and the identified second part key A (156_1) to machine keys stored on computing device 101 and determine that they both match a machine key A of the same compatibility group 271. Based at least in part on a determination that the identified first part key A (156_1) and the identified second part key A (156_1) both match a machine key A of the same compatibility group 271, instructions 121 of computing device 101 may enable further utilization of both the received first instance of part 150 and the received second instance of part 150 by computing device 101.

In another example in which one of part 150 and one of part 250 are received by computing device 101, instructions 121 of computing device 101 may identify a first part key A (156_1) that is assigned to machine identifier 141 ("1") in a part key mapping 152 of part 150, and may identify a second part key H (256_1) assigned to machine identifier 141 ("1") in part key mapping 252 of part 250. In this example, the identified first and second part keys are different (i.e., A and H). Instructions 121 of computing device 101 may compare the identified first part key A (156_1) and the identified second part key H (256_1) to machine keys stored on computing device 101 and determine that the identified first and second part keys do not both match one or more machine keys of the same compatibility group of computing device 101, since the identified first part key A (156_1) matches machine key A of compatibility group 271, but the identified second part key H (256_1) does not match any machine key of compatibility group 271 (or any compatibility group of computing device 101). Based at least in part on the determination that the identified first and second part keys do not both match one or more machine keys of the same compatibility group, instructions 121 of computing device 101 may enable further utilization of the received first part 150 by computing device 101 and may inhibit further utilization the received second part 250 by computing device 101.

In another example in which one of part 150 and one of part 350 are received by computing device 101, instructions 121 of computing device 101 may identify a first part key A (156_1) that is assigned to machine identifier 141 ("1") in a part key mapping 152 of part 150, and may identify a second part key C (356_1) assigned to machine identifier 141 ("1") in part key mapping 352 of part 350. In this example, the identified first and second part keys are different (i.e., A and C). Instructions 121 of computing device 101 may compare the identified first part key A (156_1) and the identified second part key C (356_1) to machine keys stored on computing device 101 and determine that the identified first and second part keys do not both match one or more machine keys of the same compatibility group of computing device 101, since the identified first part key A (156_1) matches machine key A of compatibility group 271, and the identified second part key C (356_1) matches machine key C of compatibility group 291. Based at least in part on the determination that the identified first and second part keys do not both match one or more machine keys of the same compatibility group, instructions 121 of computing device 101 may inhibit further utilization of at least one of the received first part 150 and the received second part 350 by computing device 101. For example, based at least in part on this determination, instructions 121 of computing device 101 may inhibit further utilization of one of the received first and second parts 150 and 350 and enable further utilization of the other, or may inhibit further utilization both the received first and second parts 150 and 350 by computing device 101.

For example, based at least in part on a determination that the identified first part key A (156_1) and the identified second part key C (356_1) match respective machine keys of different ones of compatibility groups 271 and 291, instructions 121 of computing device 101 may select one of the received first and second parts 150 and 350 to enable, enable further utilization of the selected part (e.g., part 150) by computing device 101, and inhibit further utilization of the non-selected part (e.g., part 350) by computing device 101.

Instructions 121 may select which of the parts to enable and which not to in any suitable manner. For example, instructions 121 may select the part to enable based on the order in which they are received or validated for compatibility. For example, if part 150 is received and subject to validation by instructions 121 before part 350 is received by computing device 101, then instructions 121 may determine to enable part 150 based at least in part on first part key A (156_1) matching machine key A in compatibility group 271. In such examples, when part 350 is later received by computing device 101, instructions 121 may inhibit further utilization of part 350 based on the identified second part key C (356_1) not matching any machine key in compatibility group 271, since previously validated and enabled part 150 was enabled based at least in part on first part key A (156_1) matching machine key A in compatibility group 271.

In other examples, instructions 121 may select the part to enable based on another previously received and validated part. For example, if previously received part was received and validated based on having a part key (indexed by "1") matching a machine key in compatibility group 271, then when parts 150 and 350 are received, instructions 121 may select part 150 to enable based at least in part on first part key A (156_1) matching machine key A in compatibility group 271, and may not select part 350 to enable based at least in part on second part key C (356_1) not matching any machine key in compatibility group 271.

In other examples, in which more than two parts are being validated together, instructions 121 may select the subset of the received parts having the most parts having part keys (indexed by "1") matching the same compatibility group (e.g., if three of part 150 and one of part 350 are being validated together, instructions 121 may select all of the instances of part 150 to enable for further utilization, and select to inhibit further utilization of part 350). In other examples, the selection may be based at least in part on other factors, such as part characteristics, or the like. In some examples, functionalities described herein in relation to FIG. 3 may be provided in combination with functionalities described herein in relation to any of FIGS. 1-2 and 4A-6.

FIG. 4A is a block diagram of another example of computing devices each having multiple compatibility groups and parts having different part key mappings. The example illustrated in FIG. 4A is different than the examples illustrated in FIGS. 1-3, but for ease of illustration, expands on the examples illustrated in FIG. 1-3, respectively, as described above. However, the example described in relation to FIG. 4A is not be construed as limiting the respective examples illustrated in FIGS. 1-3.

The example illustrated in FIG. 4A includes computing device 101, computing device 102, part 150, part 250, and part 350, as described above in relation to FIG. 3. In the example illustrated in FIG. 4A, a new computing device 103 may be produced. Computing device 103 may store (e.g., in a machine-readable storage medium) compatibility information 233, comprising a machine identifier 243 ("3") associated with computing device 103, a first compatibility group 273 including a collection machine keys 263 (i.e., C, D, E), and a second compatibility group 293 including another collection of machine keys 283 (i.e., K, L, M). Computing device 103 may include a machine-readable storage medium to store a copy of instructions 121 (as described above), at least one processing resource to execute instructions 121, and one or more areas to receive parts (e.g., as described above in relation to areas 111 and 115) (not shown).

In the example illustrated in FIG. 4A, computing device 103 may be compatible with parts 250 and 350, and parts 250 and 350 may be compatible with one another. In such examples, computing device 103 may be provided with its sets of machine keys such that computing device 103 may enable further utilization of both parts 250 and 350, individually, or in a combination of parts 250 and 350. This may be done without changing the machine keys of any of the existing computing devices 101 and 102 and without changing any of the part keys of any of the existing parts 150, 250, and 350.

For example, instructions 121 of computing device 103 may enable part 250 when received by computing device 103 since a part key C (256_3) associated with machine identifier "3" of computing device 103 (e.g., Mapping_252[3]=C) matches machine key C of compatibility group 273 of computing device 103. Similarly, instructions 121 of computing device 103 may enable part 350 when received by computing device 103 since a part key D (356_3) associated with machine identifier "3" of computing device 103 (e.g., Mapping_352[3]=D) matches machine key D of compatibility group 273 of computing device 103. In such examples, instructions 121 of computing device 103 may also enable both of parts 250 and 350 together when both are received by computing device 103, since part key C (256_3) associated with machine identifier "3" (e.g., Mapping_252[3]=C) matches machine key C of compatibility group 273, and part key D (356_3) associated with machine identifier "3" (e.g., Mapping_352[3]=D) matches machine key D of the same compatibility group 273.

Continuing the example illustrated in FIG. 4A, a new part 450 may be produced. In such examples, part 450 may be compatible with computing device 103, but may be incompatible with parts 250 and 350. In such examples, part 450 may be provided with a part key mapping such that computing device 103 may enable further utilization of part 450, but not with either or both of parts 250 and 350. This may be done without changing the machine keys of any of the existing computing devices 101, 102, 103 and without changing any of the part keys of any of the existing parts 150, 250, and 350.

For example, part 450 may include a key storage device (e.g., machine readable storage medium) (not shown) to store a part key mapping 452 comprising a plurality of part keys 456 that are assigned to (e.g., indexed by or associated with) respective machine identifiers of a plurality of machine identifiers 454. Part 450 may also include a part engine (e.g., functional components of part 450 other than the key storage device) (not shown). In some examples, all of the part keys of part key mapping 452 may be the same (e.g., part key L).

In such examples, instructions 121 of computing device 103 may enable part 450 when received by computing device 103 (in some examples) since a part key L (456_3) associated with machine identifier "3" of computing device 103 (e.g., Mapping_452[3]=L) matches machine key L of compatibility group 293 of computing device 103. However, instructions 121 may not enable part 450 with either or both of parts 250 and 350, since part key L (456_3) associated with machine identifier "3" (e.g., Mapping_452[3]=L) matches machine key L of compatibility group 293, while parts 250 and 350 have part keys indexed by machine identifier "3" that do not match machine keys of the same compatibility group 293. Rather, in this example, parts 250 and 350 have part keys indexed by machine identifier "3" that match machine keys of different compatibility group 273 (e.g., Mapping_252[3]=C, and Mapping_352[3]=D). In some examples, functionalities described herein in relation to FIG. 4A may be provided in combination with functionalities described herein in relation to any of FIGS. 1-3 and 4B-6.

FIG. 4B is a block diagram of an example computing device having a machine key moved between different compatibility groups. Continuing the example illustrated in FIG. 4A (but not limiting any prior example), further testing may reveal that part 450 is compatible with parts 250 and 350.

In such examples, instructions 121 of computing device 103 may change one or more of the machine keys stored on computing device 103 so that computing device may enable further utilization of part 450 with parts 250 and 350. For example, instructions 121 of computing device 103 may remove machine key L from compatibility group 293 and add it to compatibility group 273. Such changes may be accomplished by instructions 121 performing a firmware update on computing device 103, for example, or any other suitable type of update to computing device 103.

In such examples, instructions 121 of computing device 103 may enable part 450 and either or both of parts 250 and 350 when received by computing device 103 (in some examples), since a part key L (456_3) associated with machine identifier "3" of computing device 103 (e.g., Mapping_452[3]=L) now matches machine key L of compatibility group 293, and parts 250 and 350 also have part keys indexed by machine identifier "3" that match machine keys of the same compatibility group 273 (e.g., Mapping_252[3]=C, and Mapping_352[3]=D). In some examples, functionalities described herein in relation to FIG. 4B may be provided in combination with functionalities described herein in relation to any of FIGS. 1-4A and 4C-6.

FIG. 4C is a block diagram of an example computing device having a machine key removed from its compatibility groups. Continuing the example illustrated in FIG. 4B (but not limiting any prior example), a problem may arise with part 250 when used with computing device 103, such that part 250 is to be disqualified from use with computing device 103.

In such examples, instructions 121 of computing device 103 may change one or more of the machine keys stored on computing device 103 so that computing device may inhibit further utilization of part 250 when received by computing device 103. For example, instructions 121 of computing device 103 may remove machine key C from compatibility group 273. Such changes may be accomplished by instructions 121 as described above. In such examples, instructions 121 of computing device 103 may inhibit further utilization of part 250 when received by computing device 103, since a part key C (256_3) associated with machine identifier "3" of computing device 103 (e.g., Mapping_252[3]=C) no longer matches any machine key of computing device 103 (i.e., of any compatibility group). In such examples, this update may be accomplished by updating the machine keys of computing device 103 without updating the machine keys of computing device 101 or 102, and without changing the part keys of any of the parts. In some examples, functionalities described herein in relation to FIG. 4B may be provided in combination with functionalities described herein in relation to any of FIGS. 1-4A and 4C-6.

Figure 5:
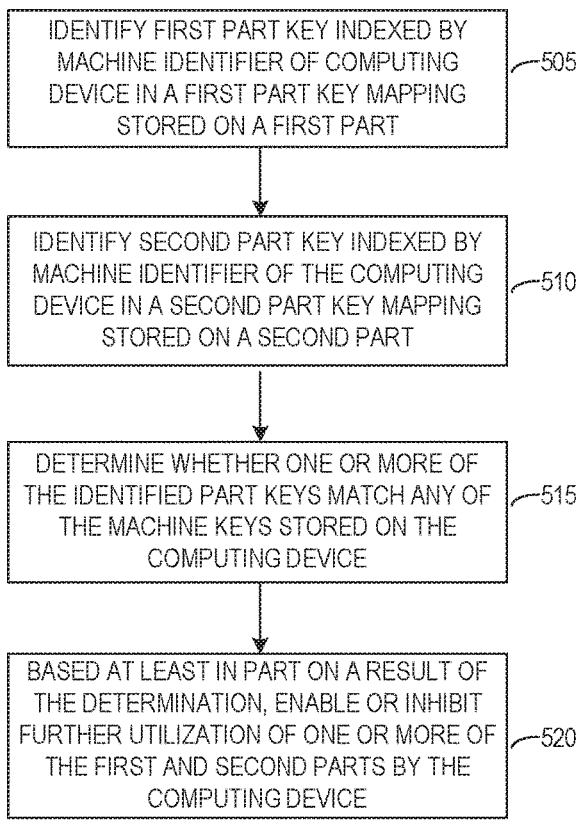
FIG. 5 is a flowchart of an example method including comparing an identified part key to a collection of one or more machine keys.

FIG. 5 is a flowchart of an example method 500 including comparing an identified part key to a collection of one or more machine keys. Although execution of method 500 is described below with reference to computing device 101 of FIG. 3, other computing device suitable for the execution of method 500 may be utilized (e.g., computing devices 101, 102, or 103 of any of FIGS. 1, 2, 3, 4A-4C). Additionally, implementation of method 500 is not limited to such examples.

At 505 of method 500, instructions 121 of computing device 101, when executed, may identify a first part key A (156_1) indexed by machine identifier 141 ("1") associated with computing device 101 in a first part key mapping 152 stored on a first part 150 received by computing device 101. As described above, the first part key mapping 152 may include a first plurality of part keys 156 indexed by a plurality of machine identifiers 154, respectively. First part key mapping 152 may have different part keys of the first plurality of part keys 156 indexed by different machine identifiers for at least some of the plurality of machine identifiers (e.g., Mapping_152[1]=A, Mapping_152[3]=B, etc.).

At 510, instructions 121 of computing device 101, when executed, may identify a second part key indexed by machine identifier 141 ("1") associated with computing device 101, the second part key mapping stored on a second part received by computing device 101. The second part key mapping may include a second plurality of part keys indexed by a plurality of machine identifiers, respectively, that are the same as machine identifiers 154.

At 515, instructions 121 may determine whether one or more of the identified first part key A (156_1) and the identified second part key match any of one or more machine keys stored on the computing device. At 520, based at least in part on a result of the determination, instructions 121 may enable or inhibit further utilization of one or more of the first part 150 and the second part by computing device 101. For example, based at least in part on the result of the determination being that the identified first part key A (156_1) matches one of the machine keys stored on computing device 101, instructions 121 may enable further utilization of the first part 150 by computing device 101. In such examples, based at least in part on the result of the determination being that the identified second part key does not match any of the machine keys stored on computing device 101, instructions 121 may inhibit further utilization of the second part by computing device 101.

Although the flowchart of FIG. 5 shows a specific order of performance of certain functionalities, method 500 is not limited to that order. For example, the functionalities shown in succession in the flowchart may be performed in a different order, may be executed concurrently or with partial concurrence, or a combination thereof. In some examples, functionalities described herein in relation to FIG. 5 may be provided in combination with functionalities described herein in relation to any of FIGS. 1-4C and 6.

Figure 6:
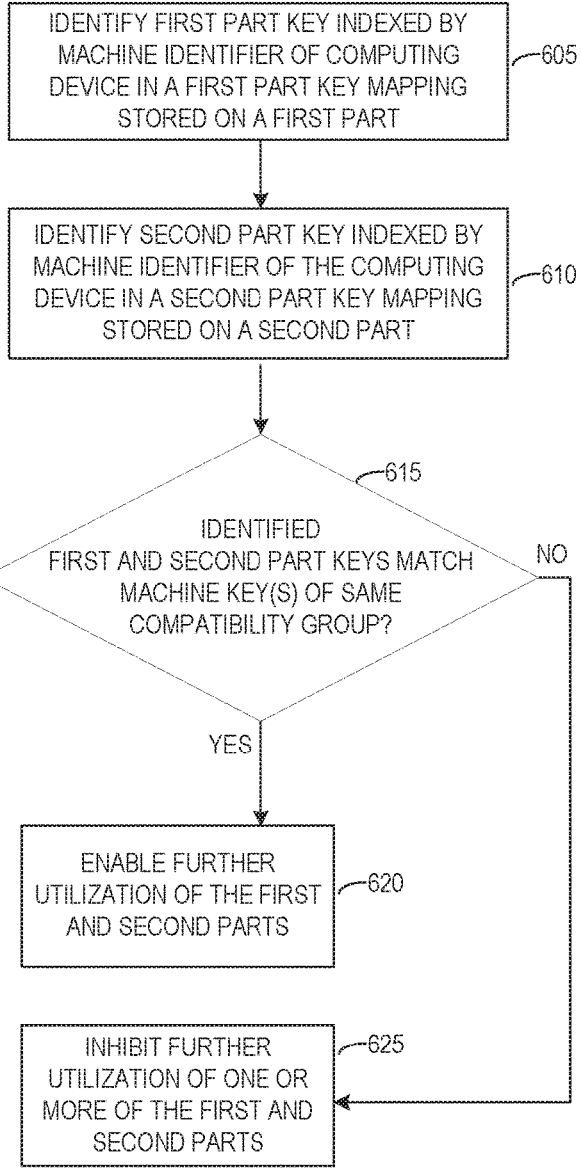
FIG. 6 is a flowchart of an example method including comparing an identified part key to machine keys of compatibility groups of a computing device.

FIG. 6 is a flowchart of an example method including comparing an identified part key to machine keys of compatibility groups of a computing device. Although execution of method 600 is described below with reference to computing device 103 of FIG. 4A, other computing device suitable for the execution of method 600 may be utilized (e.g., computing devices 101, 102, or 103 of any of FIGS. 1, 2, 3, 4A-4C). Additionally, implementation of method 600 is not limited to such examples.

At 605 of method 600, instructions 121 of computing device 103, when executed, may identify a first part key C (256_3) indexed by machine identifier 243 ("3") associated with computing device 103 in a first part key mapping 252 stored on a first part 250 received by computing device 103. As described above, the first part key mapping 252 may include a first plurality of part keys 256 indexed by a plurality of machine identifiers 254, respectively. First part key mapping 252 may have different part keys of the first plurality of part keys 256 indexed by different machine identifiers for at least some of the plurality of machine identifiers (e.g., Mapping_252[1]=H, Mapping_252[3]=C, etc.).

At 610, instructions 121 of computing device 103, when executed, may identify a second part key indexed by machine identifier 243 ("3") associated with computing device 103, the second part key mapping stored on a second part received by computing device 103. The second part key mapping may include a second plurality of part keys indexed by a plurality of machine identifiers, respectively, that are the same as machine identifiers 354. In some examples, the second part may be part 350 or part 450.

In some examples, computing device 103 comprises a first compatibility group 273 including the collection of one or more machine keys 263 and comprises a second compatibility group 293 including another collection of one or more machine keys 283. In such examples, at 615, instructions 121 may determine whether the identified first part key C (256_3) and the identified second part key match one or more machine keys of the same compatibility group of computing device 103.

For example, the second part may be part 350 in some examples. In such examples, instructions 121 may determine that the identified first part key C (256_3) and an identified second part key D (356_3) associated with machine identifier "3" of computing device 103 (e.g., Mapping_352[3]=D) both match machine keys of the same compatibility group of computing device 103 (e.g., compatibility group 273). In such examples, method 600 may proceed to 620 based at least in a part on the result of the determination being that the identified first and second part keys (e.g., C and D) match one or more machine keys (e.g., C and D) of the same compatibility group (e.g., 273) of the first and second compatibility groups 273 and 293. At 620, instructions 121 may enable further utilization of first part 250 and second part 350 by computing device 103.

In other examples, the second part may be part 450. In such examples, instructions 121 may determine that the identified first part key C (256_3) and an identified second part key L (456_3) associated with machine identifier "3" of computing device 103 (e.g., Mapping_452[3]=L) do not both match one or more machine keys of the same compatibility group of computing device 103. In such examples, method 600 may proceed to 625 based at least in a part on the result of the determination being that the identified first and second part keys (e.g., C and L) do not both match one or more machine keys (e.g., C and D) of the same compatibility group (e.g., 273) of the first and second compatibility groups 273 and 293. At 625, instructions 121 may inhibit further utilization of one or more of the first part 250 and the second part 450 by computing device 103.

Although the flowchart of FIG. 6 shows a specific order of performance of certain functionalities, method 600 is not limited to that order. For example, the functionalities shown in succession in the flowchart may be performed in a different order, may be executed concurrently or with partial concurrence, or a combination thereof. In some examples, functionalities described herein in relation to FIG. 6 may be provided in combination with functionalities described herein in relation to any of FIGS. 1-5.

As used herein, a "computing device" may be a server, storage device, storage array, desktop or laptop computer, switch, router, or any other processing device or equipment including a processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In examples described herein, a processing resource may fetch, decode, and execute instructions stored on a storage medium to perform the functionalities described in relation to the instructions stored on the storage medium. In other examples, the functionalities described in relation to any instructions described herein may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the example illustrated in FIG. 1, storage medium 120 may be implemented by one machine-readable storage medium, or multiple machine-readable storage media.

In examples described herein, a storage array may be a computing device comprising a plurality of storage devices and one or more controllers to interact with host devices and control access to the storage devices. In some examples, the storage devices may include hard disk drives (HDDs), solid state drives (SSDs), or any other suitable type of storage device, or any combination thereof. In some examples, the controller(s) may virtualize the storage capacity provided by the storage devices to enable a host to access a virtual object (e.g., a volume) made up of storage space from multiple different storage devices.

In other examples, the functionalities described above in relation to instructions described herein may be implemented by one or more engines which may be any combination of hardware and programming to implement the functionalities of the engine(s). In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one of the engine(s). In some examples, the at least one machine-readable storage medium may store instructions that, when executed by the at least one processing resource, at least partially implement some or all of the engine(s). In such examples, a computing device may include the at least one machine-readable storage medium storing the instructions and the at least one processing resource to execute the instructions. In other examples, the engine may be implemented by electronic circuitry.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), EEPROM, volatile memory, non-volatile memory, flash memory, a storage drive (e.g., a hard disk drive (HDD)), a solid state drive, any type of storage disc (e.g., a compact disc, a DVD, etc.), or the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components. In some examples, instructions may be part of an installation package that, when installed, may be executed by a processing resource to implement functionalities described herein.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. An article comprising a non-transitory machine-readable storage medium comprising instructions executable by a processing resource of a computing device to:
    identify, based on the computing device accessing a first part key mapping stored on a first part received by the computing device, a first part key that is assigned to a given machine identifier in the first part key mapping, the first part key mapping including a plurality of machine identifiers and a first plurality of part keys assigned in the first part key mapping to respective machine identifiers of the plurality of machine identifiers, wherein the first part key mapping has different part keys of the first plurality of part keys assigned to different machine identifiers for at least some of the plurality of machine identifiers, and wherein the given machine identifier is associated with the computing device;
    compare the identified first part key to a collection of one or more machine keys stored on the computing device to determine whether the identified first part key matches any machine key of the collection;
    in response to a determination that the identified first part key matches a machine key in the collection, enable further utilization of the first part by the computing device; and
    in response to a determination that the identified first part key does not match any machine key in the collection, inhibit further utilization of the first part by the computing device.

2. The article of claim 1, wherein the instructions are executable by the processing resource to:
    identify, based on the computing device accessing a second part key mapping stored on a second part received by the computing device, a second part key that is assigned to the given machine identifier in the second part key mapping having a second plurality of part keys assigned to the plurality of machine identifiers, wherein the identified first part key and the identified second part key are different.

3. The article of claim 2, wherein the instructions are executable by the processing resource to:
    in response to a determination that the identified first part key matches a machine key in the collection and the identified second part key matches a machine key in the collection, enable further utilization of the first part and the second part by the computing device; and
    in response to a determination that the identified second part key does not match any machine key in the collection, inhibit further utilization of the second part by the computing device.

4. The article of claim 2, wherein:
for each respective machine identifier of the plurality of machine identifiers, the first and second part key mappings assign different part keys to the respective machine identifier,
the given machine identifier is stored on the computing device, and
the first part key mapping includes spare part keys and the collection includes spare machine keys.

5. The article of claim 2, wherein the computing device comprises a first compatibility group including the collection of one or more machine keys, and comprises a second compatibility group including another collection of one or more machine keys.

6. The article of claim 5, wherein the instructions are executable by the processing resource to:
in response to a determination that the identified first part key and the identified second part key match one or more machine keys of a same compatibility group of the first compatibility group and the second compatibility group, enable further utilization of the first part and the second part by the computing device.

7. The article of claim 5, wherein the instructions are executable by the processing resource to:
in response to a determination that the identified first part key and the identified second part key do not both match one or more machine keys of a same compatibility group of the first compatibility group and the second compatibility group, inhibit further utilization of at least one of the first part and the second part by the computing device.

8. The article of claim 5, wherein the instructions are executable by the processing resource to:
in response to a determination that the identified first part key and the identified second part key match respective machine keys of different ones of the first and second compatibility groups:
select one of the first part and second part to enable;
enable further utilization of the selected one of the first part and the second part by the computing device; and
inhibit further utilization of a non-selected one of the first part and the second part by the computing device.

9. The article of claim 1, wherein the instructions are executable by the processing resource to:
cause partial powering of the first part based on providing power to standby rails of the first part, wherein providing the power to the standby rails provides power to a storage device of the first part storing the first part key mapping, but does not provide power enabling full operation of the first part;
while power is provided to the standby rails of the first part, access the first part key mapping stored on the storage device of the first part;
enable further utilization of the first part by the computing device by fully powering the first part by providing power sufficient for full operation of the first part; and
inhibit further utilization of the first part by the computing device by not fully powering the first part.

10. The article of claim 1, wherein the collection of one or more machine keys stored on the computing device indicates one or more parts considered compatible with the computing device, wherein each part received by the computing device that includes a part key, assigned to the given machine identifier, that matches a machine key in the collection is considered compatible with the computing device.

11. A computing device comprising:
a processing resource; and
a non-transitory machine-readable storage medium comprising instructions executable by the processing resource to:
cause partial powering of a first physical part, received by the computing device, to enable a storage device of the first physical part, the storage device storing a first part key mapping including a plurality of machine identifiers and a first plurality of part keys assigned in the first part key mapping to respective machine identifiers of the plurality of machine identifiers, wherein the first part key mapping has different part keys of the first plurality of part keys assigned to different machine identifiers for at least some of the plurality of machine identifiers;
while the first physical part is partially powered, identify, based on accessing the first part key mapping stored on the first physical part, a first part key that is assigned to a given machine identifier in the first part key mapping, wherein the given machine identifier is associated with the computing device;
compare the identified first part key to a collection of one or more machine keys stored on the computing device;
in response to a determination that the identified first part key matches a machine key in the collection, enable power to the first physical part to enable further utilization of the first physical part by the computing device; and
in response to a determination that the identified first part key does not match any machine key in the collection, inhibit further utilization of the first physical part by the computing device by not fully powering the first physical part.

12. The computing device of claim 11, wherein the instructions are executable by the processing resource to:
change one or more of the one or more machine keys in the collection stored on the computing device.

13. The computing device of claim 11, wherein the instructions are executable by the processing resource to:
cause partial powering of the first physical part based on providing power to standby rails of the first physical part, wherein providing the power to the standby rails provides power to the storage device of the first physical part, but does not provide power enabling full operation of the first physical part.

14. The computing device of claim 11, wherein:
each of the first plurality of part keys has a data protection format, and
each of the plurality of machine identifiers is associated with a different collection of computing devices.

15. The computing device of claim 11, wherein the instructions are executable by the processing resource to:
identify a second part key that is assigned to the given machine identifier in a second part key mapping stored on a second physical part received by the computing device and having a second plurality of part keys assigned to the plurality of machine identifiers, wherein the identified first part key and the identified second part key are different.

16. The computing device of claim 15, comprising a first compatibility group including the collection of one or more machine keys, and a second compatibility group including another collection of one or more machine keys, wherein the instructions are executable by the processing resource to:
- in response to a determination that the identified first part key and the identified second part key match one or more machine keys of a same compatibility group of the first compatibility group and the second compatibility group, enable further utilization of the first physical part and the second physical part by the computing device; and
- in response to a determination that the identified first part key and the identified second part key do not both match one or more machine keys of a same compatibility group of the first compatibility group and the second compatibility group, inhibit further utilization of at least one of the first physical part and the second physical part by the computing device.

17. A method of a computing device comprising:
- from a first part key mapping including a plurality of machine identifiers and a first plurality of part keys assigned in the first part key mapping to respective machine identifiers of the a plurality of machine identifiers, identifying a first part key in the first part key mapping indexed by a given machine identifier associated with the computing device, the first part key mapping stored on a first part received by the computing device;
- from a second part key mapping including the plurality of machine identifiers and a second plurality of part keys assigned in the second part key mapping to respective machine identifiers of the plurality of machine identifiers, identifying a second part key indexed in the second part key mapping by the given machine identifier associated with the computing device, the second part key mapping stored on a second part received by the computing device;
- wherein the first part key mapping has different part keys of the first plurality of part keys assigned to different machine identifiers for at least some of the plurality of machine identifiers;
- determining whether one or more of the identified first part key and the identified second part key match any of one or more machine keys stored on the computing device; and
- based on a result of the determination, enabling or inhibiting further utilization of one or more of the first part and the second part by the computing device.

18. The method of claim 17, further comprising:
- based on the result of the determination being that the identified first part key matches a machine key stored on the computing device, enabling further utilization of the first part by the computing device; and
- based on the result of the determination being that the identified second part key does not match any machine key stored on the computing device, inhibiting further utilization of the second part by the computing device, wherein the first part and the second part are removably connected to respective connectors of the computing device.

19. The method of claim 17, wherein the computing device comprises a first compatibility group including a collection of one or more machine keys and comprises a second compatibility group including another collection of one or more machine keys, the method further comprising:
- based on the result of the determination being that the identified first part key and the identified second part key match one or more machine keys of a same compatibility group of the first compatibility group and the second compatibility group, enabling further utilization of the first part and the second part by the computing device.

20. The method of claim 17, wherein the computing device comprises a first compatibility group including a collection of one or more machine keys and comprises a second compatibility group including another collection of one or more machine keys, the method further comprising:
- based on the result of the determination being that the identified first part key and the identified second part key do not both match one or more machine keys of a same compatibility group of the first compatibility group and the second compatibility group, inhibiting further utilization of one or more of the first part and the second part by the computing device.

* * * * *